United States Patent [19]

Silva et al.

[11] Patent Number: 5,420,088
[45] Date of Patent: May 30, 1995

[54] ELECTROCHEMICAL CATALYST RECOVERY METHOD

[75] Inventors: Laura J. Silva; Lane A. Bray, both of Richland, Wash.

[73] Assignee: Battelle Memorial Institute, Richland, Wash.

[21] Appl. No.: 9,658

[22] Filed: Jan. 26, 1993

[51] Int. Cl.$^6$ .......................... B01J 20/00; B01J 20/34
[52] U.S. Cl. .......................................... 502/22; 502/5; 502/24; 502/25; 204/89; 204/97; 204/233; 423/27; 423/54
[58] Field of Search .................. 502/22, 24, 25, 26, 502/27, 5; 204/89, 97, 233; 423/27, 54

[56] References Cited

U.S. PATENT DOCUMENTS

| | | | |
|---|---|---|---|
| 2,601,306 | 6/1952 | Lloyd et al. | 204/89 |
| 3,953,305 | 4/1976 | Connolly | 204/97 |
| 4,217,192 | 8/1980 | Lerih et al. | 204/97 |
| 4,239,616 | 12/1980 | Gearhart | 208/309 |
| 4,256,557 | 3/1981 | Soboroff et al. | 204/97 |
| 4,279,739 | 7/1981 | Roach . | |
| 4,290,880 | 9/1981 | Leonard | 208/309 |
| 4,305,814 | 12/1981 | Leonard | 208/309 |
| 4,330,429 | 5/1982 | Sasaki et al. | 502/27 |
| 4,948,476 | 8/1990 | Kamperman et al. | 204/89 |
| 5,141,753 | 8/1992 | Virtanen et al. | 204/97 |

OTHER PUBLICATIONS

Tiltscher, Wolf and Schelchsborn, *Abstract* (1984).
Eisenbach, Wilhelm O., et al., *Supercritical Fluid Extraction of Oil Sands and Residues from Oil and Coal Hydrogenation*, Chapter 20, pp. 419–433.

*Primary Examiner*—Asok Pal
*Attorney, Agent, or Firm*—Wells, St. John, Roberts, Gregory & Matkin

[57] ABSTRACT

A method of recovering catalyst material from latent catalyst material solids includes: a) combining latent catalyst material solids with a liquid acid anolyte solution and a redox material which is soluble in the acid anolyte solution to form a mixture; b) electrochemically oxidizing the redox material within the mixture into a dissolved oxidant, the oxidant having a potential for oxidation which is effectively higher than that of the latent catalyst material; c) reacting the oxidant with the latent catalyst material to oxidize the latent catalyst material into at least one oxidized catalyst species which is soluble within the mixture and to reduce the oxidant back into dissolved redox material; and d) recovering catalyst material from the oxidized catalyst species of the mixture. The invention is expected to be particularly useful in recovering spent catalyst material from petroleum hydroprocessing reaction waste products having adhered sulfides, carbon, hydrocarbons, and undesired metals, and as well as in other industrial applications.

53 Claims, 3 Drawing Sheets

ELECTROCHEMICAL CATALYST RECOVERY METHOD

CONTRACTUAL ORIGIN OF THE INVENTION

This invention was, in part, made with government support under Contract DE-AC06-76RLO 1830, awarded by the U.S. Department Of Energy. The U.S. government has certain rights in the invention.

TECHNICAL FIELD

This invention relates to processing of catalyst material.

BACKGROUND OF THE INVENTION

Catalysts are widely used in process industries to facilitate many classes of important reactions including, but not limited to, chemicals manufacture, fats and oils manufacture, pollution abatement and petroleum processing. Use of catalysts for production of fuels and chemical feed stocks from petroleum will continue to grow due to (1) economic pressures to upgrade heavier crudes and other feeds with higher levels of impurities, (2) competitive pressures to achieve higher conversions using less energy, and (3)pressures to increase reaction selectivities to minimize waste production.

All catalysts gradually lose activity due to coking, poisoning by metals, sulfur, or halides, or loss of surface area due to sintering at high process temperatures. Regeneration is possible where the catalyst deactivation can easily be reversed. For example, naphtha reforming catalysts are routinely regenerated by removal of a carbon accumulation and reused for multiple cycles. However, the economic life of catalyst is ultimately limited by regeneration costs and the extent of irreversible deactivation.

As waste disposal regulations become more stringent and disposal of spent catalyst becomes more costly, clean alternatives for spent catalyst recovery or disposal become an increasing factor in waste minimization strategies. Presently, more than 50 million pounds of spent hydrocracking, hydrotreating, and naphtha reforming catalysts are consumed every year by the U.S. petroleum refining industry alone. Spent catalyst is typically disposed of in land fills or, if the metals value is high enough, sold to a metals reclaimer. Reclaiming spent catalyst materials typically involves conventional metallurgical processes, such as roasting, acid leaching, caustic dissolution, reactions with $H_2S$ or $Cl_2$, and calcination.

Petroleum hydroprocessing has been widely used by oil refiners for the past several decades to upgrade heavy crude oil fractions into marketable fuel products. Hydrotreating and hydrocracking processes are conventionally carried out in a fixed-bed, trickle-flow reactor. However, future advances in conventional fixed-bed catalysts and processes are expected to yield only marginal improvements.

Recently, petroleum research has included development of "slurry hydroprocessing" which may be the next generation of heavy oil upgrading processes. Much higher conversions are expected to be possible by using slurry catalysts than conventional pellet or shaped catalysts because of a higher surface area for contacting. Advantages of slurry processing include, a) higher conversion of residual crude (via cracking) to more valuable transportation fuels, b) better removal of sulfur and nitrogen from the fuel, and c) better removal of metals (i.e., Ni, V) that poison catalysts in other refinery units. Refinery profits have been, and will continue to be, increasingly dependent upon the refiner's capability to upgrade residual oil, otherwise typically referred to as the "bottom of the barrel". Slurry hydroprocessing shows enormous potential for increased profits in utilizing such residual oil.

Although slurry hydroprocessing is a promising approach for heavy oil upgrading, such has not seen commercialization as of this date. Part of the problem is believed to be centered on the catalyst material. Candidate catalysts, such as Mo, Ni, Co, and W, can provide good activity and stability. Since these catalysts are fairly expensive, they would have to be recovered and recycled for any slurry hydroprocessing process to be economical.

However, it is costly to recover many types of spent catalysts in an environmentally acceptable manner. For example, spent catalysts from petroleum residuum hydrotreating are typically encased in "coke balls". Such principally comprise very high-boiling carbonaceous material, and also include metal sulfides of Ni and V which are considered contaminates. Presently proposed techniques for recovering such catalysts include coking, roasting and acid or base leaching. These operations typically operate under severe acid or base conditions and/or generate polluting byproducts. Hazardous or toxic chemicals are used in conventional processes. In addition, the energy requirements of operating equipment such as roasters would be substantial.

Needs remain for methods of recovering catalyst material from reaction waste material solids and other latent catalyst material solids for the petroleum and other industries.

The subject mater of the present invention is particularly pointed out and distinctly claimed in the concluding portion of this specification. However, both the organization and method of operation, together with further advantages, may best be understood by reference to the following description taken in connection with the accompanying drawings wherein like reference numerals refer to like elements.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a method of recovering catalyst material from latent catalyst material solids comprises the following steps:

combining latent catalyst material solids with a liquid acid anolyte solution and a redox material which is soluble in the acid anolyte solution to form a mixture;

electrochemically oxidizing the redox material within the mixture into a dissolved oxidant, the oxidant having a potential for oxidation which is effectively higher than that of the latent catalyst material;

reacting the oxidant with the latent catalyst material to oxidize the latent catalyst material into at least one oxidized catalyst species which is soluble within the mixture and to reduce the oxidant back into dissolved redox material; and recovering catalyst material from the oxidized catalyst species of the mixture.

By way of example, latent catalyst material solids might comprise spent catalyst material in reaction waste material solids, with such material ;having adhered reaction waste products such as sulfides, carbon, hydrocarbons, and undesired metals. Alternately by way of example, latent catalyst material solids might comprise material requiring processing to be initially processed into a more active form for the desired reaction needing catalysis. Example latent or spent catalyst material to be treated for recovery would comprise transition metals or transition metal compounds, such as transition metal oxides or metal sulfides. Examples include Ni or Mo with or without a support. Typical supports are alumina, silica alumina or zeolites. Other classes of catalysts include precious metal catalysts (Pt, Rh, Pd on supports), or metal oxide catalysts (such as $CuO \cdot Cr_2O_3$).

Where reaction waste material solids are being processed, preferably such are treated with an extraction process to recover adhered hydrocarbons or other organic materials therefrom prior to electrochemical dissolution. There are generally two purposes for treatment with such an extraction step: 1) removing carbon from the catalyst improves the electrochemical step; and 2) in petroleum processing, increased oil recovery may improve process economics.

Preferably, the unextracted material would then be sent through a particle reduction step. Electrochemical dissolution performance improves with increased surface area of the solids. Particle size would preferably be 20 mesh or less. Then, the reaction waste material solid particles would preferably be washed with a wetting solvent that is soluble in both water and hydrocarbons (i.e., acetone or a similar solvent). The solvent will wet the surface of the solids, which would still be coated with undesired adhered reaction waste products such as coked material. The solvent could be filtered from the solids and recycled for wetting additional waste material solids.

The wetted solids would then be sent to an electrochemical dissolution step, where they would be combined with a liquid acid anolyte solution (for example nitric or sulfuric acids) having a redox material which is soluble in the acid anolyte solution, thus forming a mixture. Example redox materials for use in generating a dissolved oxidant would include cerium, silver, cobalt, and manganese ions in solution, with specific examples being $Ce^{3+}$, $Ag^+$, $Co^{2+}$ and $Mn^{2+}$. Redox materials can be present in less than stoichiometric amounts, and essentially function as catalysts for the redox reactions.

Cerium, for example, could be provided in solution by addition of $Ce(NO_3)_4$. Such a mixture would be provided in the anode side of an electrochemical cell, or otherwise exposed to an anode potential. The redox material would be electrochemically oxidized within the mixture into a dissolved oxidant, with the oxidant having a potential for oxidation which is effectively higher than that of the latent or spent catalyst material. Additionally and most preferably, the dissolved oxidant will have a potential for oxidation which is effectively higher than that of the adhered reaction waste products, such as adhered sulfides, carbon, hydrocarbons and other metals. In the context of this document, "effectively higher" signifies an oxidation potential which is sufficiently high to effect or produce the subject oxidation(s).

For example, where the redox material comprises aqueous $Ce^{3+}$, such will be electrochemically oxidized to $Ce^{4+}$ at the anode. From $Ag^+ Co^{2+}$ and $Mn^{2+}$, the dissolved oxidants will be $Ag^{2+}$, $Co^{3+}$ and $Mn^{3+}$, respectively. Such materials are strong oxidants having potentials for oxidation which are significantly higher than that of the latent or spent catalyst material and adhered reaction products. The dissolved oxidant generated in solution, in turn, oxidizes the latent or spent catalyst material into at least one oxidized catalyst species which is soluble within the mixture, with such reaction also effectively reducing the dissolved oxidant (i.e., $Ce^{4+}$) back into dissolved redox material (i.e., $Ce^{3+}$).

Preferably and typically, the dissolved oxidant also has a potential for oxidation which is effectively higher than that of the adhered reaction waste products. Therefore in such instances, the oxidant will also react with the adhered reaction waste products. Specifically in the above-described process, the oxidant will react with sulfides to form mixture soluble forms of oxidized sulfur, typically sulfates. Additionally, the oxidant will react with hydrocarbons and with other carbon to form gaseous forms of oxidized carbon (i.e., CO or $CO_2$) which will be expelled or otherwise out-gassed from the mixture. Such reactions also reduce the oxidant back into dissolved redox material, and occur essentially simultaneously or otherwise compete with the reaction which forms the oxidized catalyst species. Other undesired adhered metal contaminates, such as Ni, V and Fe, are also oxidized to soluble metal species.

The net anodic reactions are:

$$C_xH_y + 2xH_2O \rightarrow xCO_2 + (4x+y)e^- + (4x+y)H^+ \tag{1}$$

METAL SULFIDES + WATER → ELECTRONS + HYDROGEN IONS + AQUEOUS METALS + AQUEOUS SULFUR SPECIES (2)

The specific anodic reactions for oxidation of metal sulfides depends on the specific metal species present. Examples for typical hydrotreating catalyst metals are:

$$NiS + 4H_2O \rightarrow Ni^{2+} + SO_4^{2-} + 8e^- + 8H^+ \tag{3}$$

$$MoS_2 + 8H_2O \rightarrow Mo^{6+} + 18e^- + 2SO_4^{2-} + 16H^+ \tag{4}$$

Where the catalyst material being recovered is refractory copper chromite ($CuO \cdot Cr_2O_3$), such can be dissolved electrochemically by oxidizing the chromium from the +3 oxidation state to the +6 oxidation state in an acid solution. Such oxidation is facilitated by the dissolved oxidant. Where cerium redox material is employed, the half reaction associated with oxidizing the chromium is:

$$2Cr^{3+} + 7H_2O \rightarrow Cr_2O_7^{2-} + 14H^+ + 6e^- \quad E^0 = -1.33 \text{ V} \tag{5}$$

The redox reaction with cerium in nitric acid would be:

$$Cr_2O_3 + 6Ce^{4+} + 4H_2O \rightarrow Cr_2O_7^{2-} + 6Ce^{3+} + 8H^+ \quad (6)$$

Cerium oxidant is continuously regenerated at the anode by the following reaction:

$$Ce^{3+} \rightarrow Ce^{4+} + e^- \quad E^0 = 1.74 \text{ V} \quad (7)$$

$$Ag^+ \rightarrow Ag^{2+} + e^- \quad E^0 = 1.98 \text{ V} \quad (8)$$

Unproductive anodic reactions may also occur, such as the dissociation of water to oxygen:

$$2H_2O \rightarrow 4H^+ + O_2 + 4e^- \quad (9)$$

The extent of such side reactions represents inefficiencies in electric current utilization and depends on the reaction conditions and the kinetics of these reactions relative to the desired reactions.

The net anodic reactions are balanced by corresponding cathodic reactions. Cathodic reactions will be determined by the species present in the catholyte, cell potential, current density and mass transport characteristics in the cell. Example half reactions in the cathode compartment in the above-described example are the reduction of nitric acid to $NO_x$ and water, such as:

$$HNO_3 + 3H^+ + 3e^- \rightarrow NO + 2H_2O \quad (10)$$

Combining Equations 6, 7, 8, and 10 gives a total electrochemical reaction of:

$$Cr_2O_3 + 2HNO_3 \rightarrow 2H^+ + Cr_2O_7^{2-} + 2NO \quad (11)$$

Displaced copper also dissolves readily into the mixture. In the above copper chromite example, the dissolved oxidized species are $Cr_2O_7^{2-}$ and $Cu^{2+}$. Organics that are present with the spent catalyst will be oxidized by the redox catalyst to carbon dioxide and water. Sulfides are oxidized to soluble sulfur species. $NO_x$ byproducts from the cell could be oxidized and scrubbed to recover and recycle nitric acid, in accordance with known prior art processes. For example, reactions for these steps include:

$$2NO + O_2 \rightarrow 2NO_2 \quad (12)$$

$$3NO_2 + H_2O \rightarrow 2HNO_3 + NO \quad (13)$$

Combining equations 12 and 13 gives:

$$2NO + 3/2 \, O_2 + H_2O \rightarrow 2HNO_3 \quad (14)$$

Combining equations 11 and 14 gives a net reaction for oxidation of $Cr^{3+}$ to $Cr^{6+}$ of:

$$Cr_2O_3 + 3/2 \, O_2 + H_2O \rightarrow 2H^+ + Cr_2O_7^{2-} \quad (15)$$

If the catalyst material contains barium (as some copper chromite catalysts do), the barium will dissolve in the electrochemical cell until a barium nitrate solubility limit is reached. At that point, the barium nitrate will precipitate. This precipitate can be separated from the bulk anode solution, and the barium can be redissolved. The barium solution can then be blended back to a catalyst remanufacturing process at a desired ratio.

The above-described electrochemical dissolution can be conducted under ambient conditions, such as atmospheric pressure and room temperature. It is however believed that heating of the mixture above room temperature to as high as its boiling point, during electrochemical dissolution will facilitate the reaction where high molecular weight compounds are involved, such as in treating petroleum hydroprocessing reaction waste material solids. Once the latent or spent catalyst material is dissolved into some oxidized catalyst species, subsequent steps would typically be required to separate the desired material into a valuable product stream. Example dissolved catalyst species would include $Cu^{2+}$, $MoO_2^{2-}$, $Co^{2+}$, and $WO_2^{2-}$ for copper, molybdenum, nickel, cobalt and tungsten containing catalysts, respectively. Other dissolved material also might be recovered, depending on economics. The design of these separation steps would depend on the chemistry of the specific catalyst to be treated. Conventional hydrometallurgical technique may be used for separations. The complexity of the catalyst chemistry will determine whether it would be practical to remanufacture catalyst material on-site or process spent catalyst material off-site.

One example step of recovering such catalyst material from the oxidized catalyst species of the mixture would be to precipitate catalyst material merely by adjusting mixture pH. For example, precipitation of Mo and W would typically occur by lowering pH, while precipitation of Ni and Co would occur by raising pH. Alternately, catalyst material might be recovered from the oxidized catalyst species of the mixture by adding a precipitating reactant to remove either the species or redox material. Further alternately, the recovered anolyte mixture might be subjected to an electric potential to electrowin catalyst material from the mixture. Even further, the recovering of metal catalyst material could comprise electrodialysis, as described in more detail below. Evaporation techniques might also be employed for catalyst material recovery.

For example, where cerium is utilized in the above-described copper chromite example, cerium can be selectively removed by adding ammonium hydroxide ($NH_4OH$) to the processed anolyte solution. This results in precipitation of cerium hydroxide. The copper remains in solution by complexing with the ammonium ion, and the chromium anion remains soluble. Chromium (III) does not complex with ammonium ion, and would be precipitated with the cerium ion. Catalyst material could be recovered by electrodialysis or other means.

If silver is used as the redox material, some of it will inherently precipitate as silver dichromate in the anode of the electrochemical cell. The silver dichromate precipitate can be filtered from solution and redissolved in another solution. Dissolved silver in the anode compartment solution can be selectively removed by adding hydrochloric acid, which results in precipitation of silver chloride. The silver chloride precipitate can be filtered from solution and then electrolytically destroyed to produce silver nitrate and chlorine gas.

Once the redox material is removed, the copper chromate solution can be sent to a conventional catalyst manufacturing process. For example, several known methods can be used to prepare copper chromite catalyst. The most common method is by decomposition of a copper chromate salt.

Catalyzed electrochemical dissolution for recovery of spent catalyst promises several advantages over conventional approaches. For example, the adhered carbonaceous material would be completely oxidized to carbon dioxide electrochemically at low temperatures (less than 100° C.) rather than through a roasting step at higher temperatures. Production of undesirable by-products of roasting would be avoided. Metal sulfides that are present in the spent catalyst would be converted to soluble sulfur species and contained in an aqueous stream rather than converted to $SO_x$.

Figure 1:
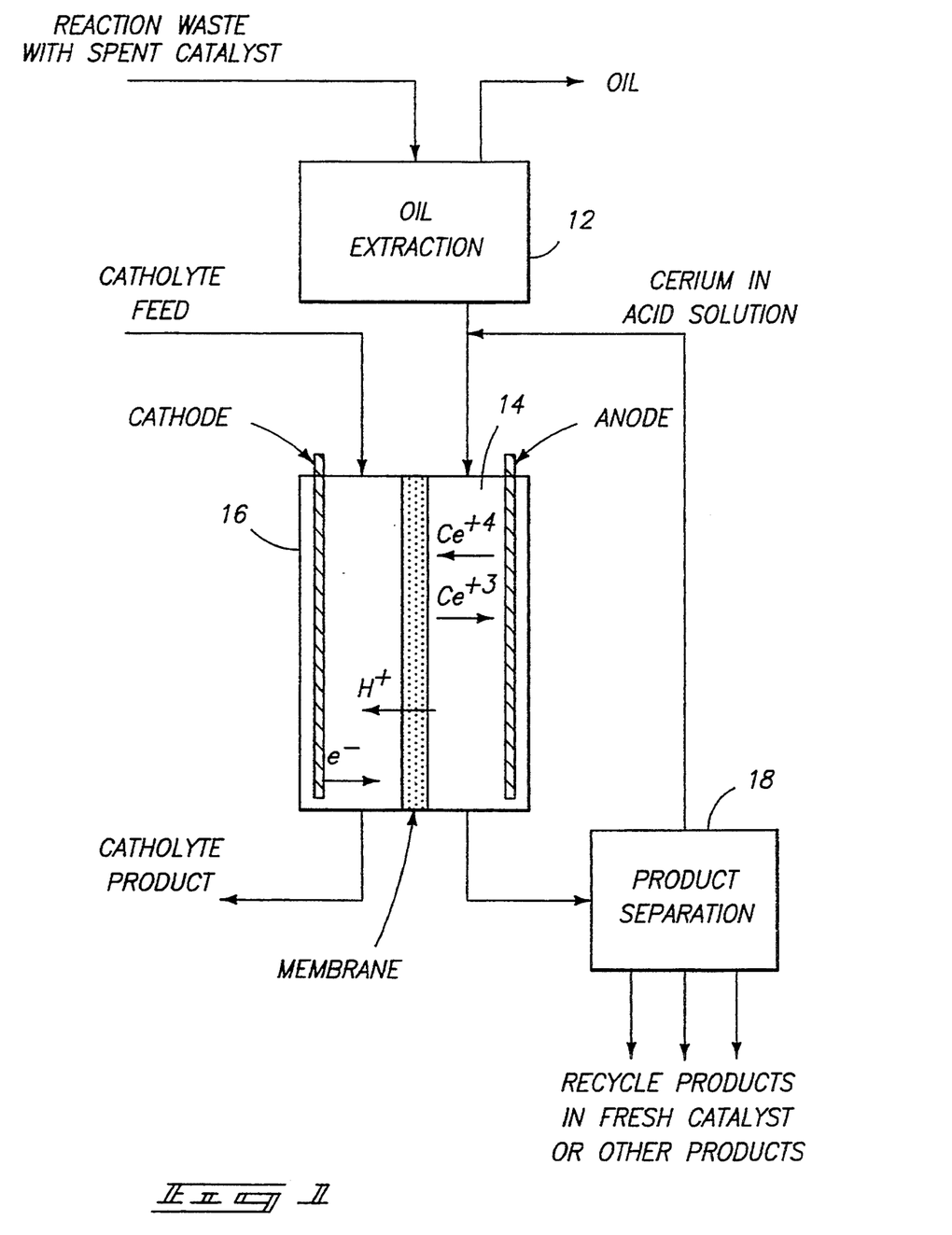
FIG. 1 is a schematic or block diagram view of a process in accordance with the invention.

FIG. 1 diagrammatically illustrates a process in accordance with the invention. Reaction waste material solids are fed to an oil extraction process 12, preferably a supercritical fluid extraction process. The bottoms from such extraction process 12 are then fed into an anode compartment 14 of an electrolytic cell 16 for electrochemical dissolution. Catholyte feed to cell 16 would typically comprise water and/or a desired reactant for a secondary reaction process. Material from the anode solution would be processed to separate the redox material by a product separation 18, and fed back to anode compartment 14 for subsequent electrochemical conversion to oxidant.

Figure 2:
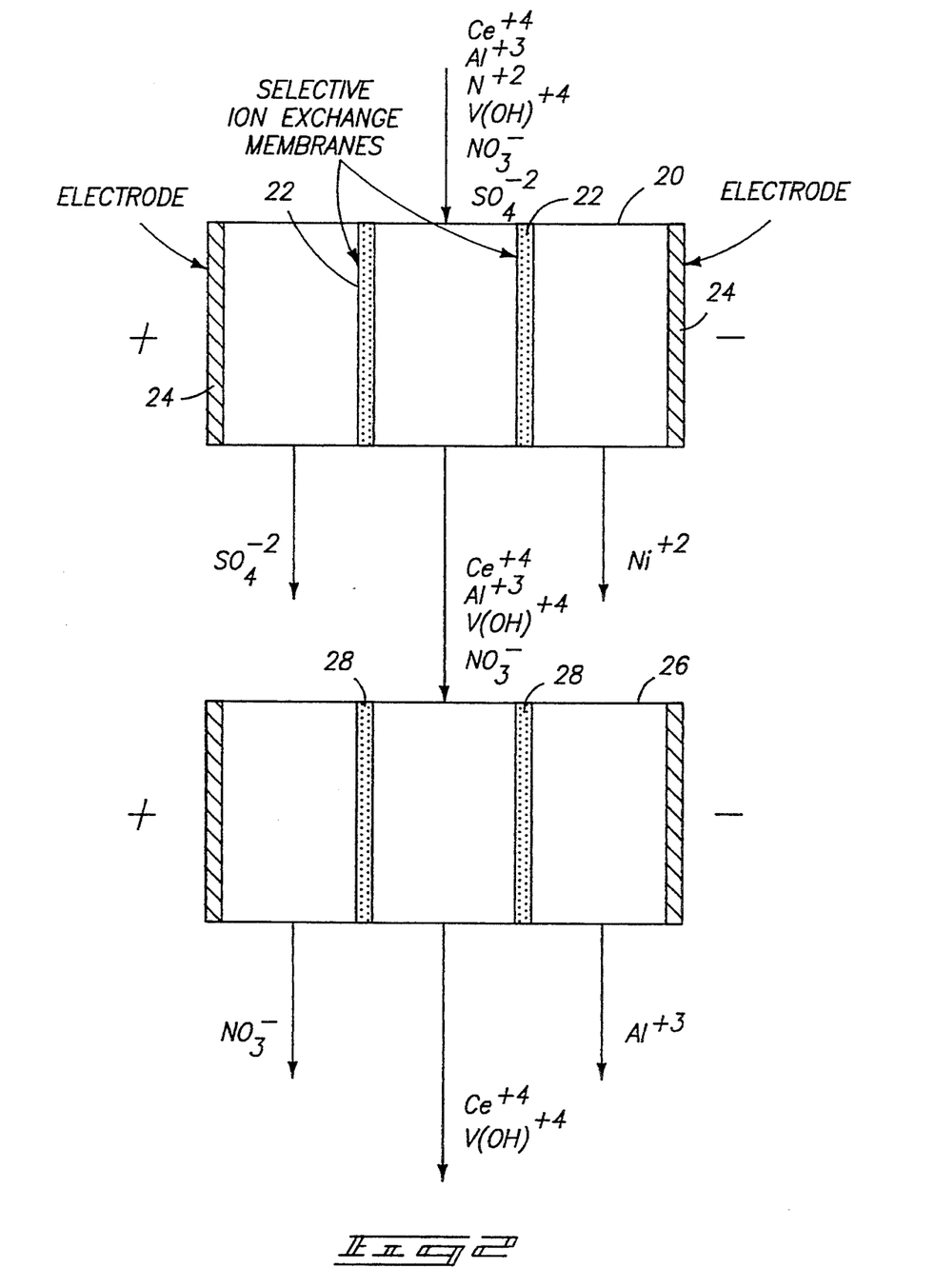
FIG. 2 is a diagram of an electrodialysis process for separating soluble ions.

Electrodialysis is but one example of how redox material and catalyst material might be separated from solution. FIG. 2 illustrates one possible process where the processed mixture includes dissolved ions of $Ce^{4+}$, $Al^{3+}$, $Ni^{2+}$, $V(OH)^{4+}$, $SO_4^{2-}$ and $NO_3^-$, where for example one or both of $Ni^{2+}$ and $Al^{3+}$ might comprise the desired dissolved oxidized catalyst species to be recovered. A first (top) illustrated electrodialysis cell 20 is configured with ion exchange membranes 22 which pass $SO_4^{2-}$ and $Ni^{2+}$, but not the other listed ions, and electrodes 24. A second (bottom) illustrated electrodialysis cell 26 is configured with ion exchange membranes 28 which pass $NO_3^-$ and $Al^{3+}$, but not $Ce^{4+}$ or $V(OH)^{4+}$. Other electrodialysis separation schemes could of course be provided. For example membranes and potentials could be selected which only pass respective 1, 2, 3 and 4 valence state ions.

Figure 3:
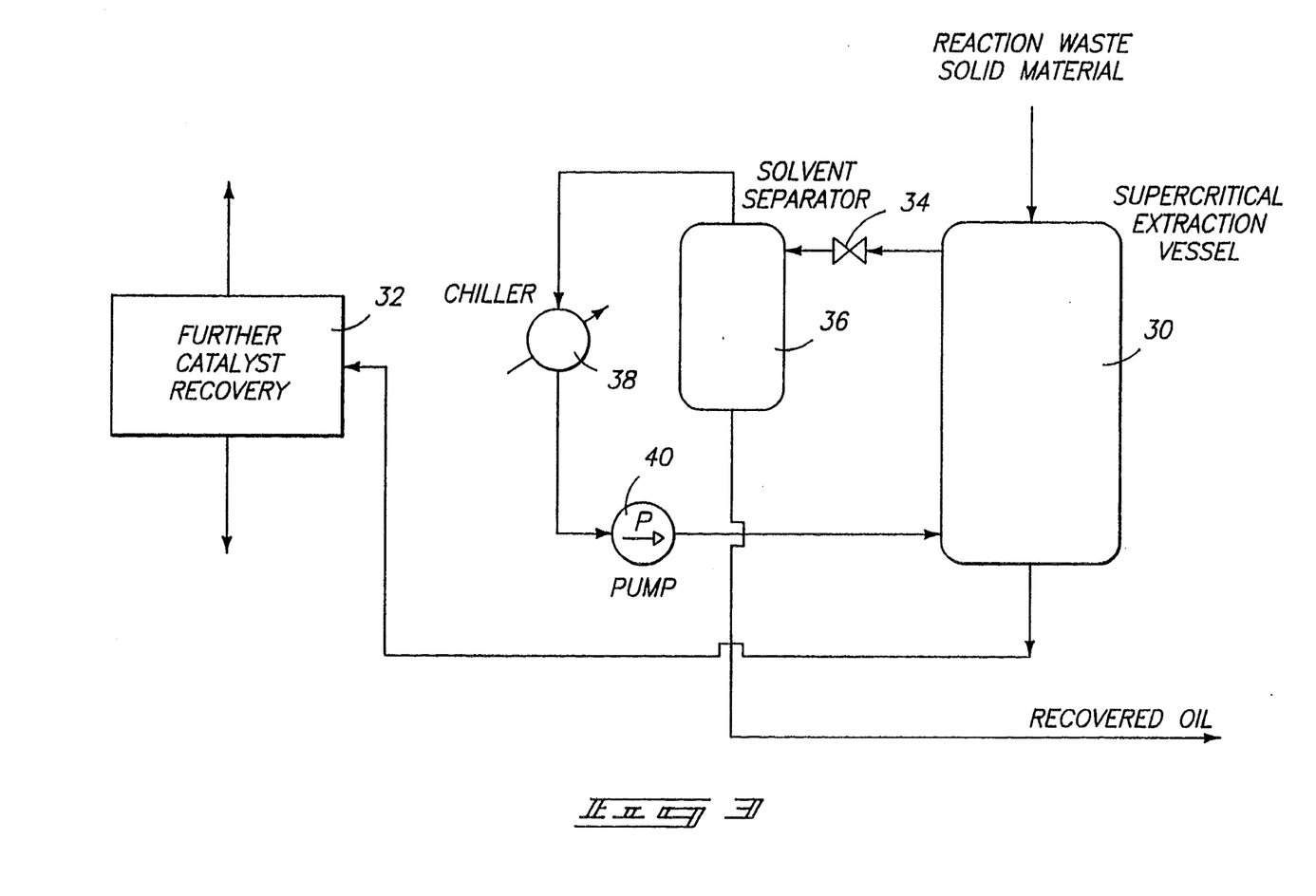
FIG. 3 is a diagram of a pretreatment supercritical fluid extraction process.

An example process for oil extraction from the waste material solids prior to electrochemical dissolution is shown in FIG. 3. Such a process comprises:

combining the waste material solids with an organic solvent or $CO_2$ solvent within a heated and pressurized extraction vessel to provide an extraction mixture, pressure within the extraction vessel being above the critical pressure of the solvent, temperature within the extraction vessel being sufficient to provide a solvent reduced temperature which is greater than or equal to about 0.9, maintaining the extraction mixture at the temperature and pressure for a period of time effective to extract oil into a non-solid state from solid catalyst material present in the reaction waste material solids;

recovering solid material from the extraction vessel, the solid material comprising the predominant portion of the catalyst material of the waste material solids initially provided to the extraction vessel, the solid material being combined with the liquid acid anolyte and redox material;

dropping the pressure of the extraction mixture to below the critical pressure of the solvent to cause a separation by vaporizing the solvent and liquefying the oil;

collecting and feeding solvent back to the extraction vessel; and recovering liquified oil.

Solvent reduced temperature in the vessel is defined as the ratio of absolute vessel temperature divided by absolute critical temperature of the solvent. Preferred solvents comprise carbon dioxide and organic compounds having three or less carbon atoms. An organic cosolvent, such as toluene, acetone or tetrahydrofuran, could also be added.

The waste material solids would be fed to a supercritical extraction vessel 30 (FIG. 3) along with solvent. The solids would be added either, a) batchwise to the vessel, where the vessel is depressured between batches, or b) added to the vessel as a "moving bed", where small amounts of solids are added to the top and withdrawn from the bottom at discrete intervals. Material passing through vessel 30 as solid material would be collected and fed to an electrochemical dissolution process 32 in accordance with the above description. The remaining fluid would be passed through a let down valve 34 into a solvent separation vessel 36, causing the solvent to vaporize and be separable from the oil which liquifies. The solvent would preferably be refrigerated by a chiller 38 and pumped by a pump 40 back to the extraction vessel pressure prior to recycle to the extraction vessel. The oil would be collected.

Reduction to Practice

Initial proof-of-principle laboratory testing was conducted for preparing a copper chromite catalyst for remanufacture. Fresh copper chromite catalyst was used for dissolution experiments. The experiments were conducted at atmospheric pressure and temperature, and proved that copper chromite catalyst can be dissolved in an electrochemical cell using either cerium or silver as the redox material. Dissolution was determined by visual examination. Up to 1 mole of copper chromite catalyst was dissolved in about 90 minutes using cerium redox material and nitric acid. Up to about 0.7 moles of copper chromite catalyst were dissolved in about 100 minutes using silver as the redox material. A control experiment conducted without any silver or cerium redox material resulted in a negligible amount of copper chromite catalyst being dissolved.

The copper chromite catalyst sample which was utilized contained barium, and a barium precipitate was formed by the electrochemical reaction. The precipitate was tested and showed that barium was the only element present. Barium can be separated from the spent catalyst after dissolution, and recombined with the final solution in the desired ratio.

Further demonstration experiments were conducted using a proprietary catalyst material used in hydrotreating, but without having the typical silica-alumina or alumina support. The proprietary fresh catalyst from which the spent catalyst material was created comprised a transition metal. The fresh catalyst had been deactivated by coking and metal deposition during a residuum hydrotreating pilot plant run. The unloaded spent catalyst was withdrawn and filtered. The spent catalyst sample consisted of about 66 wt. percent carbon plus hydrogen and 34% metal sulfides. Metal contaminates included those that typically accumulate on petroleum hydroprocessing catalyst, such as Ni, V, and Fe. The spent catalyst after storage had agglomerated into large chunks. Such chunks were prepared for experiments by grinding and filtering down to a size of less than 20 mesh.

The ground and filtered material was then packed into a high-pressure vessel for a supercritical fluid extraction pre-treatment step. The vessel had an internal volume of 5-ml (0.37 in. id ×3 in.), the temperature of which was controlled by a gas chromatograph oven. A 250 mL syringe pump with discharge pressure control was used to supply the extraction solvent to the vessel. The flow rate was not directly controlled, but was set by the pressure drop across the system. The solvent which was utilized was vaporized after passing through a pressure let-down value, and the extracted oil was collected in an ice trap. A cosolvent was used in some of the experiments to determine if a cosolvent would improve the efficiency of the extraction by improving the solubility of the oil in a bulk solvent. After pressure let-down, some of the cosolvent was vaporized with the bulk solvent, depending upon the volatility of the cosolvent. After completion of each run, extracted catalysts and extracted oil samples were weighed and analyzed for carbon and hydrogen.

Supercritical and near-critical fluid extraction experiments were conducted at pressures of 200 atto and 350 atm, and temperatures from 21° C. to 240° C. Carbon dioxide and propane were tested as bulk solvents. Toluene, tetrahydrofuran (THF), and acetone were tested as cosolvents. Extractions were conducted for a wide range of solvent amounts. Such experiments showed that hydrocarbon removal proceeds at a rapid pace during the start of an extraction, and levels off when most of the extractable oil has been removed. For most of these applications, most of the oil was removed within 20 to 30 mL of solvent per gram of spent catalyst. Extractions were typically completed in less than thirty minutes.

For the particular spent catalyst sample tested, about 65% to 75% of the carbon plus hydrogen was easily extracted. About 80% of the hydrocarbons were extracted by a conventional soxhlet extraction with THF for several hours. The remaining carbonaceous material was not effectively removed by the attempted extraction.

Increasing temperature and pressure also increased the amount extracted, as indicated below in Table 1.

TABLE 1

EFFECT OF TEMPERATURE AND PRESSURE ON HYDROCARBON REMOVAL (SOLVENT-PROPANE)

| Temperature, °C. | 50 | 100 | 240 | 100 | 200 |
|---|---|---|---|---|---|
| Pressure, atm | 200 | 200 | 200 | 350 | 350 |
| Solvent $\rho$, g/ml | 0.506 | 0.447 | 0.269 | 0.485 | 0.395 |
| C + G Removed, % | 72 | 73 | 74 | 76 | 80 |

As pressure increases and the density of the solvent increases, the equilibrium solubility of various oil components in the solvent is expected to increase. However, the observation that hydrocarbon removal improved with an increase in temperature, despite a decrease in solvent density, indicates that the extraction may be kinetically or transport limited. Increasing the temperature would increase the rate of hydrocarbon desorption from the solid surface. Also, increasing the temperature would increase the diffusion of solvent to the oil within the spent catalyst particles and the diffusion of the solvated oil to the bulk fluid.

Equilibrium solubilities may be enhanced near the critical point by addition of cosolvents such as shown in Table 2.

TABLE 2

EFFECT OF COSOLVENTS

| Solvent | $CO_2$ | $CO_2$ | $C_3H_8$ | $C_3H_8$ | $C_3H_8$ |
|---|---|---|---|---|---|
| Co-Solvent | — | Toluene | — | THF | Acetone |
| Temperature, °C. | 35 | 50 | 100 | 110 | 130 |
| Pressure, atm | 200 | 200 | 200 | 200 | 200 |
| Solvent $\rho$, g/ml | 0.877 | 0.795 | 0.447 | 0.435 | 0.410 |
| C + H Removed, % | 67 | 71 | 73 | 73 | 75 |

When cosolvents were added, temperature was increased slightly to insure that the solvent/cosolvent mixture consisted of one supercritical fluid phase.

A two-compartment, laboratory-scale electrochemical cell with titanium electrodes was used for the electrochemical dissolution experiments. The anode and cathode compartments were separated by an aluminum oxide barrier. Nitric acid solution was added to the cathode compartment. The anolyte was prepared by combining measured quantities of extracted catalyst samples with a solution of 0.5M cerium nitrate and 1–2M $HNO_3$. Constant current was applied to the cell, and the time required for dissolution of the solid was determined through visual inspection.

Most of the solids dissolved from the electrochemical dissolution within about 20 minutes. A control experiment was also conducted without using any redox material. Specifically, spent catalyst was contacted with nitric acid solution overnight, and did not dissolve. However, the solids dissolved after a few minutes of contact with $Ce^{4+}$. In the first experiment, the electrochemical dissolution was conducted at ambient conditions. The cell potential was about 8 volts, and a constant 10 amp current was applied. No catalyst dissolution was observed after 15 minutes. When the solution was heated to boiling, the catalyst material dissolved within a few minutes. Two more weighed samples of catalyst were added sequentially to the anolyte solution, and these samples were dissolved within 15 minutes and 25 minutes, respectively. A total of 0.17 g of extracted catalyst had been dissolved in about 10 mL of solution. Such indicated that this particular reaction waste material required significantly greater than 15 minutes for dissolution, or higher temperatures for the dissolution mixture.

In the second experiment, cerium sulfate was substituted for cerium nitrate, and sulfuric acid was used instead of nitric acid. The particular reaction waste material was only partially dissolved into the solution, and another solid phase-presumed to be cerium sulfate-precipitated. Such only demonstrates that cerium sulfate in a sulfuric acid solution for this particular catalyst and waste material was not effective under the experimental conditions.

In a third experiment, the subject spent catalyst particles were added to a 8M $HNO_3$ solution before adding cerium nitrate. The nitric acid reacted with the catalyst, and evolution of $NO_x$ was observed. Next, cerium nitrate was added, the solution was diluted with water, and then was added to the anode compartment. Most of the catalyst (except the larger particles) dissolved in about 10 minutes at 10 amps and 7.5 volts. After the solids had completely dissolved, the final solution was added to the product from the first experiment. This total product contained dissolved metal from about 0.38 g of extracted catalyst in about 50 mL of 2 to 4M $HNO_3$ and 0.4M cerium nitrate.

Dissolution was enhanced by washing the catalyst particles in acetone and reducing the particle size to improve contacting. Washing the solids with benzene did not improve or otherwise affect dissolution.

Results from Inductively Coupled Plasma Mass Spectroscopy (ICPMS) analyses showed (Table 3) that the ratios of dissolved metals concentrations were about the same as the ratios of metals in the spent catalyst. For this particular case, then, the dissolution was not selective for any particular catalyst components.

TABLE 3

RELATIVE AMOUNTS OF METAL CONTAMINANTS

| | Spent Catalyst | Dissolution Product | Precipitate |
|---|---|---|---|
| Catalyst Material | 100 | 100 | 100 |
| Nickel | 12 | 10 | <0.1 |
| Vanadium | 3.8 | 3.5 | 1 |

An experiment was conducted to demonstrate selective precipitation of the original catalyst material from solution. The solution containing the dissolved catalyst metal, metal contaminants, cerium nitrate, and nitric acid was concentrated by evaporation of water. A beige solid precipitated. This precipitate was filtered, washed with concentrated nitric acid, washed with distilled water, and dried. The precipitate dissolved easily in ammonium hydroxide, and this solution was analyzed by ICPMS (Table 3). More than 99% of the Ni remained in solution. Analysis also indicated that the precipitate contained V impurities. Additional washing and precipitation of this sample resulted in a precipitate with a lighter color, which probably contained less impurities.

The power required for electrochemical dissolution is expected to be a strong function of the composition of the spent catalyst. The concentration of carbon, sulfur and sulfides will probably be the most significant factor. The composition determines the amount of electrons that must be transferred, which influences the current required. The required current is also influenced by current inefficiencies resulting from driving unproductive side reactions. The cell voltage will be determined by the amount of over-potential that needs to be applied to achieve reasonable kinetics and the cell IR drop due to resistance to electron transfer as well as the equilibrium potential required for the reactions. An example power consumption calculation is shown in Table 4 for perfect utilization of current. The cell potential used is the equilibrium potential for oxidation of $Ce^{3+}$ to $Ce^{4+}$ at the anode and the reaction of $H^+$ to $H_2$ at the cathode. The equilibrium potential would be different if a different cathode reaction is chosen. Over-potential has been neglected, assuming the kinetics are fast, and the cell IR drop has been neglected.

TABLE 4

MINIMUM POWER CONSUMPTION FOR HYDRODESULFURIZATION SPENT CATALYST

| Spent Catalyst Composition, wt % | |
|---|---|
| C | 25 |
| Sulfides of Mo, Ni, V | 16 |
| Support | 59 |
| Current Efficiency, % | 100 |
| Cell Potential, V | 1.61 |
| Cell Power Requirement, Kw-hr/lb. spent catalyst | 1.7 |

In compliance with the statute, the invention has been described in language more or less specific as to methodical features. It is to be understood, however, that the invention is not limited to the specific features shown and described, since the means herein disclosed comprise preferred forms of putting the invention into effect. The invention is, therefore, claimed in any of its forums or modifications within the proper scope of the appended claims appropriately interpreted in accordance with the doctrine of equivalents.

We claim:

1. An electrochemical method of recovering catalyst material from solid latent catalyst material comprising the following steps:

combining solid latent catalyst material with a liquid acid anolyte solution and a redox material which is soluble in the acid anolyte solution to form an anolyte mixture;

in an anode chamber of a minimum two chamber electrolytic cell, the anode chamber being defined by an electrolyte membrane barrier, electrochemically oxidizing the redox material within the anolyte mixture in the anode chamber into a dissolved oxidant, the oxidant having a potential for oxidation which is effectively higher than that of the latent catalyst material;

reacting the oxidant with the solid latent catalyst material to oxidize the solid latent catalyst material into at least one oxidized species which dissolves within the anolyte mixture in the anode chamber and to reduce the oxidant back into dissolved redox material; and recovering catalyst material from the oxidized species of the anolyte mixture.

2. The method of recovering catalyst material of claim 1 wherein the latent catalyst material comprises a transition metal or a transition metal compound.

3. The method of recovering catalyst material of claim 1 wherein the latent catalyst material comprises copper chromite.

4. The method of recovering catalyst material of claim 1 wherein the dissolved oxidant comprises at least one of $Ce^{4+}$, $Ag^{2+}$, $Co^{3+}$, and $Mn^{3+}$.

5. The method of recovering catalyst material of claim 1 wherein material combined with the latent catalyst material solids and the anolyte comprises $Ce(NO_3)_4$.

6. The method of recovering catalyst material of claim 1 wherein the liquid acid anolyte comprises $HNO_3$ or $H_2SO_4$.

7. The method of recovering catalyst material of claim 1 wherein the step of recovering catalyst material comprises adjusting mixture pH to precipitate catalyst material from the oxidized catalyst species of the mixture.

8. The method of recovering catalyst material of claim 1 wherein the step of recovering catalyst material comprises adding a precipitating reactant to the mixture to precipitate catalyst material from the oxidized catalyst species of the mixture.

9. The method of recovering catalyst material of claim 1 wherein the step of recovering catalyst material comprises subjecting the mixture with oxidized catalyst species to an electric potential to electrowin catalyst material from the mixture.

10. The method of recovering catalyst material of claim 1 wherein the step of recovering catalyst material comprises electrodialysis.

11. The method of recovering catalyst material of claim 1 further comprising treating the latent catalyst material solids with a wetting agent prior to combining with the liquid acid anolyte and redox material.

12. The method of recovering catalyst material of claim 1 wherein the steps of oxidizing and reacting occur substantially at atmospheric pressure and at about the boiling temperature of the mixture.

13. The method of recovering catalyst material of claim 1 wherein the latent catalyst material comprises a transition metal or a transition metal compound, and the dissolved oxidant comprises at least one of $Ce^{4+}$, $Ag^{2+}$, $Co^{3+}$, $Mn^{3+}$.

14. An electrochemical method of recovering catalyst material from solid latent catalyst material comprising the following steps:
   combining latent catalyst material solids with a liquid acid anolyte solution and a redox material which is soluble in the acid anolyte solution to form an anolyte mixture;
   in an anode chamber of a minimum two chamber electrolytic cell, electrochemically oxidizing the redox material within anolyte the mixture into a dissolved oxidant, the oxidant having a potential for oxidation which is effectively higher than that of the latent catalyst material;
   reacting the oxidant with the latent catalyst material to oxidize the solid latent catalyst material into at least one oxidized species which dissolves within the anolyte mixture and to reduce the oxidant back into dissolved redox material;
   recovering catalyst material from the oxidized species of the anolyte mixture; and
   the latent catalyst material comprising copper chromite, and the dissolved oxidant comprising at least one of $Ce^{4+}$, $Ag^{2+}$, $Co^{3+}$, and $Mn^{3+}$.

15. An electrochemical method of recovering catalyst material from solid latent catalyst material comprising the following steps:
   combining solid latent catalyst material with a liquid acid anolyte solution and a redox material which is soluble in the acid anolyte solution to form an anolyte mixture;
   in an anode chamber of a minimum two chamber electrolytic cell, electrochemically oxidizing the redox material within the anolyte mixture into a dissolved oxidant, the oxidant having a potential for oxidation which is effectively higher than that of the latent catalyst material;
   reacting the oxidant with the solid latent catalyst material to oxidize the solid latent catalyst material into at least one oxidized species which dissolves within the anolyte mixture and to reduce the oxidant back into dissolved redox material;
   recovering catalyst material from the oxidized species of the anolyte mixture; and
   the latent catalyst material comprising copper chromite, the dissolved oxidant comprising cerium in the form of $Ce^{4+}$, and the step of recovering including adding ammonium hydroxide to the mixture containing the oxidized catalyst species to precipitate cerium hydroxide out from such mixture; and recovering copper and chromium from the mixture out of which cerium hydroxide has precipitated.

16. An electrochemical method of recovering catalyst material from solid latent catalyst material comprising the following steps:
   combining solid latent catalyst material with a liquid acid anolyte solution and a redox material which is soluble in the acid anolyte solution to form an anolyte mixture;
   in an anode chamber of a minimum two chamber electrolytic cell, electrochemically oxidizing the redox material within the anolyte mixture into a dissolved oxidant, the oxidant having a potential for oxidation which is effectively higher than that of the latent catalyst material;
   reacting the oxidant with the solid latent catalyst material to oxidize the solid latent catalyst material into at least one oxidized species which dissolves within the anolyte mixture and to reduce the oxidant back into dissolved redox material;
   recovering catalyst material from the oxidized species of the anolyte mixture; and
   the latent catalyst material comprising copper chromite, the dissolved oxidant comprising silver in the form of $Ag^{2+}$, and the step of recovering including adding hydrochloric acid to the mixture containing the oxidized catalyst species to precipitate silver chloride out from such mixture; and recovering copper and chromium from the mixture out of which silver chloride has precipitated 17. The method of recovering catalyst material of claim 1 wherein the latent catalyst material comprises a transition metal or a transition metal compound; the dissolved oxidant comprises at least one of $Ce^{4+}$, $Ag^{2+}$, $Co^{3+}$, and $Mn^{3+}$; and the liquid acid anolyte comprises $HNO_3$ or $H_2SO_4$.

18. An electrochemical method of recovering catalyst material from reaction waste material solids, the reaction waste material solids comprising solid spent catalyst material having adhered reaction waste products, the method comprising the following steps:
   combining reaction waste material solids with a liquid acid anolyte solution and a redox material which is soluble in the acid anolyte solution to form an anolyte mixture;
   in an anode chamber of a minimum two chamber electrolytic cell, the anode chamber being defined by an electrolyte membrane barrier, electrochemically oxidizing the redox material within the anolyte mixture in the anode chamber into a dissolved oxidant, the oxidant having a potential for oxidation which is effectively higher than that of the spent catalyst material and adhered reaction waste products;
   reacting the oxidant with the solid spent catalyst material to oxidize the solid spent catalyst material into at least one oxidized species which dissolves within the anolyte mixture in the anode chamber and to reduce the oxidant back into dissolved redox material;
   reacting the oxidant with the adhered reaction waste products; and
   recovering catalyst material from the oxidized species of the anolyte mixture.

19. The method of recovering catalyst material of claim 18 wherein the spent catalyst material comprises a transition metal or a transition metal compound.

20. The method of recovering catalyst material of claim 18 wherein the spent catalyst material comprises copper chromite.

21. The method of recovering catalyst material of claim 18 wherein the dissolved oxidant comprises at least one of $Ce^{4+}$, $Ag^{2+}$, $Co^{3+}$, and $Mn^{3+}$.

22. The method of recovering catalyst material of claim 18 wherein material combined with the spent catalyst material solids and the anolyte comprises $Ce(NO_3)_4$.

23. The method of recovering catalyst material of claim 18 wherein the liquid acid anolyte comprises $HNO_3$ or $H_2SO_4$.

24. The method of recovering catalyst material of claim 18 further comprising treating the reaction waste material solids with a wetting agent prior to combining with the liquid acid anolyte and redox material.

25. The method of recovering catalyst material of claim 18 wherein the steps of oxidizing and reacting occur substantially at atmospheric pressure at about the boiling temperature of the mixture.

26. The method of recovering catalyst material of claim 18 wherein the spent catalyst material comprises a transition metal or a transition metal compound, and the dissolved oxidant comprises at least one of $Ce^{4+}$, $Ag^{2+}$, $Co^{3+}$, and $Mn^{3+}$.

27. The method of recovering catalyst material of claim 18 wherein the spent catalyst material comprises copper chromite, and the dissolved oxidant comprises at least one of $Ce^{4+}$, $Ag^{2+}$, $Co^{3+}$, and $Mn^{3+}$.

28. The method of recovering catalyst material of claim 18 wherein the latent catalyst material comprises copper chromite, the dissolved oxidant comprises cerium in the form of $Ce^{4+}$, and the step of recovering includes adding ammonium hydroxide to the mixture containing the oxidized catalyst species to precipitate cerium hydroxide out from such mixture; and recovering copper and chromium from the mixture out of which cerium hydroxide has precipitated.

29. The method of recovering catalyst material of claim 18 wherein the latent catalyst material comprises copper chromite, the dissolved oxidant comprises silver in the form of $Ag^{2+}$, and the step of recovering includes adding hydrochloric acid to the mixture containing the oxidized catalyst species to precipitate silver chloride out from such mixture; and recovering copper and chromium from the mixture out of which silver chloride has precipitated.

30. The method of recovering catalyst material of claim 18 wherein the spent catalyst material comprises a transition metal or a transition metal compound; the dissolved oxidant comprises at least one of $Ce^{4+}$, $Ag^{2+}$, $Co^{3+}$, and $Mn^{3+}$; and the liquid acid anolyte comprises $HNO_3$ or $H_2SO_4$.

31. The method of recovering catalyst material of claim 18 wherein the step of recovering comprises electrodialysis.

32. The method of recovering catalyst material of claim 18 further comprising subjecting the reaction waste material solids to a supercritical fluid extraction process to recover oil therefrom prior to the combining step.

33. An electrochemical method of recovering petroleum hydroprocessing catalyst material from petroleum hydroprocessing reaction waste material solids, the waste material solids comprising solid spent catalyst material having adhered sulfides, carbon and hydrocarbons, the method comprising the following steps:

combining petroleum hydroprocessing reaction waste material solids with a liquid acid anolyte solution and a redox material which is soluble in the acid anolyte solution to form an anolyte mixture;

in an anode chamber of a minimum two chamber electrolytic cell, the anode chamber being defined by an electrolyte membrane barrier, electrochemically oxidizing the redox material within the anolyte mixture in the anode chamber into a dissolved oxidant, the oxidant having a potential for oxidation which is effectively higher than that of the spent catalyst material and adhered sulfides, carbon and hydrocarbons;

reacting the oxidant with the solid spent catalyst material to oxidize the solid spent catalyst material into at least one oxidized species which dissolves within the anolyte mixture in the anode chamber and to reduce the oxidant back into dissolved redox material;

reacting the oxidant with the sulfides to form anolyte mixture soluble forms of oxidized sulfur;

reacting the oxidant with the hydrocarbons and with the carbon to form gaseous forms of oxidized carbon which are expelled from the anolyte mixture; and recovering catalyst material from the oxidized species of the anolyte mixture.

34. The method of recovering catalyst material of claim 33 wherein the spent catalyst material comprises a transition metal or a transition metal compound.

35. The method of recovering petroleum hydroprocessing catalyst material of claim 33 wherein the spent catalyst material comprises copper chromite.

36. The method of recovering petroleum hydroprocessing catalyst material of claim 33 wherein the dissolved oxidant comprises at least one of $Ce^{4+}$, $Ag^{2+}$, $Co^{3+}$, and $Mn^{3+}$.

37. The method of recovering petroleum hydroprocessing catalyst material of claim 33 wherein material combined with the spent catalyst material solids and the anolyte comprises $Ce(NO_3)_4$.

38. The method of recovering petroleum hydroprocessing catalyst material of claim 33 wherein the liquid acid anolyte comprises $HNO_3$ or $H_2SO_4$.

39. The method of recovering petroleum hydroprocessing catalyst material of claim 33 further comprising treating the reaction waste material solids with a wetting agent prior to combining with the liquid acid anolyte and redox material.

40. The method of recovering petroleum hydroprocessing catalyst material of claim 33 wherein the steps of oxidizing and reacting occur substantially at atmospheric pressure and the boiling temperature of the mixture.

41. The method of recovering petroleum hydroprocessing catalyst material of claim 33 wherein the spent catalyst material comprises a transition metal or a transition metal compound, and the dissolved oxidant comprises at least one of $Ce^{4+}$, $Ag^{2+}$, $Co^{3+}$, and $Mn^{3+}$.

42. The method of recovering petroleum hydroprocessing catalyst material of claim 33 wherein the spent catalyst material comprises copper chromite, and the dissolved oxidant comprises at least one of $Ce^{4+}$, $Ag^{2+}$, $Co^{3+}$, and $Mn^{3+}$.

43. The method of recovering catalyst material of claim 33 wherein the latent catalyst material comprises copper chromite, the dissolved oxidant comprises cerium in the form of $Ce^{4+}$, and the step of recovering includes adding ammonium hydroxide to the mixture containing the oxidized catalyst species to precipitate cerium hydroxide out from such mixture; and recovering copper and chromium from the mixture out of which cerium hydroxide has precipitated.

44. The method of recovering catalyst material of claim 33 wherein the latent catalyst material comprises copper chromite, the dissolved oxidant comprises silver in the form of $Ag^{2+}$, and the step of recovering includes adding hydrochloric acid to the mixture containing the oxidized catalyst species to precipitate silver chloride out from such mixture; and recovering copper and chromium from the mixture out of which silver chloride has precipitated.

45. The method of recovering petroleum hydroprocessing catalyst material of claim 33 wherein the spent catalyst material comprises a transition metal or a transition metal compound; the dissolved oxidant comprises at least one of $Ce^{4+}$, $Ag^{2+}$, $Co^{3+}$, and $Mn^{3+}$; and the liquid acid anolyte comprises $HNO_3$ or $H_2SO_4$.

46. The method of recovering catalyst material of claim 33 wherein the step of recovering comprises electrodialysis.

47. The method of recovering petroleum hydroprocessing catalyst material of claim 33 further comprising subjecting the petroleum hydroprocessing reaction waste material solids to a supercritical fluid extraction process to recover oil therefrom prior to the combining step.

48. The method of recovering petroleum hydroprocessing catalyst material of claim 33 further comprising subjecting the petroleum hydroprocessing reaction waste material solids to an extraction process to recover oil therefrom prior to the combining step, the extraction process comprising the following sequential steps:

combining the waste material solids with an organic solvent or $CO_2$ solvent within a heated and pressurized extraction vessel to provide an extraction mixture, pressure within the extraction vessel being above the critical pressure of the solvent, temperature within the extraction vessel being sufficient to provide a solvent reduced temperature which is greater than or equal to about 0.9, maintaining the extraction mixture at the temperature and pressure for a period of time effective to extract oil into a non-solid state from solid catalyst material present in the reaction waste material solids;

recovering solid material from the extraction vessel, the solid material comprising the predominant portion of the catalyst material of the waste material solids initially provided to the extraction vessel, the solid material being combined with the liquid acid anolyte and redox material;

dropping the pressure of the extraction mixture to below the critical pressure of the solvent to cause a separation by vaporizing the solvent and liquefying the oil;

collecting and feeding solvent back to the extraction vessel; and recovering liquified oil.

49. The method of recovering petroleum hydroprocessing catalyst material of claim 48 wherein the temperature within the extraction vessel is greater than the critical temperature of the solvent.

50. The method of recovering petroleum hydroprocessing catalyst material of claim 48 wherein the organic solvent consists essentially of organic compounds having three or less carbon atoms or consists essentially of $CO_2$.

51. The method of recovering petroleum hydroprocessing catalyst material of claim 48 further comprising combining an organic cosolvent with the solvent and waste material solids in the extraction vessel.

52. The method of recovering petroleum hydroprocessing catalyst material of claim 48 further comprising combining an organic cosolvent with the solvent and waste material solids in the extraction vessel, the organic cosolvent being selected from the group consisting of toluene, acetone and tetrahydrofuran.

53. The method of recovering petroleum hydroprocessing catalyst material of claim 48 wherein the temperature within the extraction vessel is greater than the critical temperature of the solvent, the method further comprising combining an organic cosolvent with the solvent and waste material solids in the extraction vessel, the organic cosolvent being selected from the group consisting of toluene, acetone and tetrahydrofuran.

* * * * *